US008736850B2

(12) United States Patent
Am Weg et al.

(10) Patent No.: US 8,736,850 B2
(45) Date of Patent: May 27, 2014

(54) METHOD AND DEVICE FOR MEASURING SURFACES IN A HIGHLY PRECISE MANNER

(75) Inventors: Christian Am Weg, Langen (DE); Gernot Berger, Dortmund (DE); Thilo May, Darmstadt (DE); Ralf Nicolaus, Darmstadt (DE); Jurgen Petter, Griesheim (DE)

(73) Assignee: LUPHOS GmbH, Mainz (DE)

( * ) Notice: Subject to any disclaimer, the term of this patent is extended or adjusted under 35 U.S.C. 154(b) by 0 days.

(21) Appl. No.: 13/982,455

(22) PCT Filed: Feb. 8, 2012

(86) PCT No.: PCT/EP2012/000575
§ 371 (c)(1),
(2), (4) Date: Jul. 29, 2013

(87) PCT Pub. No.: WO2012/107225
PCT Pub. Date: Aug. 16, 2012

(65) Prior Publication Data
US 2013/0308139 A1 Nov. 21, 2013

(30) Foreign Application Priority Data
Feb. 11, 2011 (DE) .................... 10 2011 011 065

(51) Int. Cl.
*G01B 11/24* (2006.01)
*G01B 11/02* (2006.01)
*G01B 21/20* (2006.01)

(52) U.S. Cl.
CPC .............. *G01B 11/026* (2013.01); *G01B 11/24* (2013.01); *G01B 21/20* (2013.01)
USPC ....................................................... 356/601

(58) Field of Classification Search
CPC ....... G01B 11/24; G01B 11/026; G01B 21/20
See application file for complete search history.

(56) References Cited

U.S. PATENT DOCUMENTS

| 6,008,901 | A | 12/1999 | Ohtsuka | |
|---|---|---|---|---|
| 2006/0290942 | A1* | 12/2006 | Henselmans et al. | 356/498 |
| 2010/0225926 | A1 | 9/2010 | Van Amstel | |
| 2011/0080593 | A1* | 4/2011 | Sato | 356/612 |

FOREIGN PATENT DOCUMENTS

| DE | 10 2006 019 623 B4 | 3/2007 |
|---|---|---|
| DE | 60 2004 004916 T2 | 11/2007 |
| DE | 10 2008 033942 B3 | 4/2010 |

OTHER PUBLICATIONS

European Patent Office, International Search Report for International Application No. PCT/EP2012/000575 filed Feb. 8, 2012, dated May 30, 2012, pp. 3-5.
European Patent Office, Written Opinion of the International Search Report for International Application No. PCT/EP2012/000575 filed Feb. 8, 2012, pp. 3-6.
The International Bureau of WIPO, International Preliminary Report on Patentability and Written Opinion of the International Searching Authority for Internationa Application No. PCT/EP2012/000575, English Language Translation, Aug. 13, 2013, pp. 4-8.

* cited by examiner

*Primary Examiner* — Gregory J Toatley
*Assistant Examiner* — Juan D Valentin, II
(74) *Attorney, Agent, or Firm* — Christopher C. Dremann, P.C.; Christopher C. Dremann

(57) ABSTRACT

A device and a method for measuring at least one surface section of an object that is mounted on a carrier includes at least one reference object that can be fixed relative to the carrier, and a holder that can be moved relative to the reference object in at least one first direction and on which a reference body and a distance measuring device are arranged. The reference body and the distance measuring device are mounted in a rotatable manner relative to each other. The distance measuring device is designed to determine a first distance to a first point of the surface section of the object and a second distance to a second point of the reference body wherein the second point corresponds to the first point.

13 Claims, 3 Drawing Sheets

METHOD AND DEVICE FOR MEASURING SURFACES IN A HIGHLY PRECISE MANNER

CROSS REFERENCE TO RELATED APPLICATIONS

This U.S. non-provisional patent application is the national stage of International Application No. PCT/EP2012/000575 filed Feb. 8, 2012, which claims the benefit of priority to German Application No. 10 2011 011 065.8 filed Feb. 11, 2011.

FIELD OF THE INVENTION

The present invention relates to a method and a device for measuring the topology or the surface of any object in a highly precise manner on the basis of an optical, contactless scan of the object.

BACKGROUND OF THE INVENTION

In quality control and also for monitoring industrial production processes, particularly in the field of precision engineering, optics and in the production engineering of mechanical and electrical microstructures, there is an increasing demand for measurements of work piece surfaces with the highest possible resolution and level of precision.

Thus, for example, DE 10 2008 033 942 B3 discloses a distance sensor operating on the principle of multi-wavelength interferometry, which uses a plurality of laser light sources, the emitted wavelengths of which lie in the optical telecommunication range between 1520 nm and 1630 nm. The signals of the lasers used herein are combined in a common fiber by multiplexers and routed to a multi-wavelength sensor head. In principle, such a multi-wavelength distance measuring method enables interferometric scanning of topologies and surfaces of any objects using reflection geometry, wherein the multi-wavelength method provides a comparatively large, uniquely assignable measurement region and wherein it is moreover possible to achieve measurement accuracy in the nanometer or even in the sub-nanometer range.

Furthermore, DE 60 2004 004 916 T2 has disclosed an optical free-form surface measuring device, in which a contour-scanning distance sensor is placed substantially orthogonally in relation to a surface to be measured. Here, the distance sensor is placed on a rotatable device, which itself is arranged on a platform that can be moved in relation to a measurement frame. Furthermore, a measurement surface is provided on the rotatable device that holds the distance sensor, the distance of which measurement surface to the measurement frame is measured by means of an apparatus for contactless distance measurement. Finally, provision is made for a rotational measurement apparatus for measuring the rotational angle between two measurement directions, wherein the first measurement direction is prescribed by the movement direction between the platform and the measurement frame and the second measurement direction is prescribed by the distance between the distance sensor and the surface of the element to be measured.

In the case of such a sensor, which, for example, scans the surface of an object without contact in one scanning movement, the movement and the accuracy of the positioning of the sensor in relation to the object to be measured play a decisive role.

In order to be able to establish precisely the distance between the distance sensor and the surface to be measured, the sensor must be aligned substantially orthogonally to the surface to be measured and must adapt the alignment thereof in accordance with the contour of the object to be measured. For this adaptation, both translational and rotational movements of the sensor are to be carried out.

Although a translational movement of the sensor in relation to a fixed reference can be established with a sufficiently high accuracy by means of further distance sensors, it is precisely a rotation or tilt of the sensor that was found to be problematic.

In the case of the demanded measurement accuracy in the nanometer or sub-nanometer range, a rotation of the sensor furthermore always also brings about a non-negligible translational displacement of the sensor in relation to the platform carrying the sensor. Thus, the measurement signal from the sensor must be corrected by at least the positional displacement of the sensor caused by the rotational movement of the sensor. The mechanical tolerances of the sensor bearing cause non-reproducible positional changes of the sensor in different angular positions. It is therefore necessary to determine precisely the position of the sensor for each possible alignment of the sensor.

OBJECTS OF THE INVENTION

The underlying object of the present invention is therefore that of providing a device and a corresponding method for measuring surfaces of objects in a highly precise manner, wherein possible positioning inaccuracies of the sensor, caused by, for example, a rotational movement of the sensor head, should be determined in a simple manner and should be compensated for accordingly. Here, the device should be distinguished by a design which is as simple as possible, saves space and can be implemented in a cost-effective manner. It should also have a design that resists external interferences to the best possible extent.

SUMMARY OF THE INVENTION

The aforementioned object is achieved by a device and method in accordance with the appended independent claims, wherein advantageous embodiments of the device and method of the invention, respectively, are the subject matter of the dependent claims.

A device according to the invention is embodied to measure at least one surface section of an object mounted on a carrier. Here, the device has at least one reference object which can be fixed in relation to the carrier. In so doing, carrier and reference object need not necessarily be connected or mechanically coupled to one another. In principle, it is sufficient for the centers of gravity or the axes of symmetry of the object carrier, of the object itself and/or of the reference object not to be moved in relation to one another during a measurement procedure, but rather remain static at their respective position so that they are, so to speak, spatially fixed in relation to one another. Here, a rotational movement of the object, preferably about one of its axes of symmetry, is provided for measuring the overall surface thereof. However, there is no need to establish a relative distance to the reference object for measuring the surface of the object. Furthermore, the device has a holder which can move in at least a first direction in relation to the reference object. Arranged on this holder are a reference body and a distance measuring instrument or a distance measuring apparatus. Here, distance measuring instrument and reference body are mounted rotatable relative to one another.

The distance measuring instrument is furthermore configured to determine a first distance to a first point on the surface section of the object to be measured and also a second distance to a second point, corresponding thereto, on the reference body. The first distance, to be established by means of the distance measuring instrument, constitutes the actual measurement signal, while the measured second distance can be used to establish, for example, a possible relative displacement caused by a rotation between the distance measuring instrument and the reference body, which is likewise arranged on the movable holder. In this respect, a distance correction for the first measured distance can be brought about on the basis of the second distance to be measured.

A non-reproducible displacement of the sensor, caused, for example, by the rotational movement of the distance measuring instrument, and a falsification of the measurement values caused thereby can be compensated for by determining the second distance in relation to a reference body, which is known in respect of the contour and position thereof. An offset between a rotational axis and a measurement axis of the distance measuring instrument can be compensated for computationally by establishing the first and second distances and by a relative alignment of reference body and distance measuring instrument.

The position of the movable holder in relation to the at least one reference object is preferably established by means of at least one further distance measuring instrument, in particular with a number of distance sensors, in order to be able, indirectly, to determine the position of the distance measuring instrument in relation to the reference object.

According to a preferred embodiment, the distance measuring instrument arranged on the movable holder has a first distance sensor facing the object to be measured and a second distance sensor facing the reference body. The first distance sensor serves for distance measurement between distance measuring instrument and object to be measured, while the second distance sensor serves to determine the position of the distance measuring instrument or the first distance sensor relative to the movable holder. The position of the holder can, in turn, be determined by means of at least one sensor, preferably by means of two sensors aligned in different directions, in relation to the at least one reference object, preferably in relation to two reference objects.

Here, the two distance sensors are preferably arranged in a common plane which extends transversely to the alignment of the rotational axis of the distance measuring instrument. In this respect, the directions along which the two sensors measure the distance to the reference body or to the object surface lie in a common plane.

In a further embodiment thereof, the distance measuring instrument is mounted rotatably on the movable holder and the reference body is arranged in a rotationally fixed manner on the holder. Affixing the reference body on the holder enables, in particular, a very precise determination of the position of the distance measuring instrument in relation to the holder itself.

In a further embodiment thereof, the reference body has a reference face which is matched to the rotational mobility of the distance measuring instrument. The reference face is embodied in such a way that a measurement signal emitted by the second distance sensor can be reflected by the reference face and detected by the second distance sensor again.

Here, provision is made in particular for the reference face to be embodied as a type of hollow mirror with a substantially circular segment-like geometry, the center of said hollow mirror substantially coinciding with the rotational axis of the distance measuring instrument or with the rotational axis of the first and/or the second distance sensor. The reference face has, in particular, a hollow cylindrical form, with the imagined cylinder axis extending substantially parallel to the rotational axis of the distance measuring instrument. Deviating from this, the reference face can also have a polygonal shape or any concave curved form that can be established by calibration.

According to another preferred embodiment, the first and the second distance sensor of the distance measuring instrument are aligned or arranged diametrically opposite to one another. The first distance sensor is preferably aligned in such a way that the measurement axis thereof or that the optical measurement signals emitted thereby impinge approximately orthogonally onto the surface section to be measured and are reflected back from there to the first distance sensor. As a result of the fact that the second distance sensor is aligned in the opposite direction, it is possible for the distance established thereby to find use directly in correcting the measurement signal from the first distance sensor.

The second distance measured by the second distance sensor is a direct measure for the distance correction to be undertaken for the first distance sensor. All that is required here is to determine the contour or position and extent of the reference face on the reference body once in a precise manner within the scope of calibrating the device so that a corresponding length correction or distance correction of the established measurement values, which corresponds in each case to the prevailing alignment or angular position of the distance measuring instrument, can take place. In order to calibrate the device, it is necessary to calibrate the second distance for each possible angular position of the distance measuring instrument in relation to the reference body.

According to another preferred embodiment, the distance between the reference object and the movable holder can be determined by means of at least a third distance sensor. Here, the third distance sensor can be arranged either on the reference object or on the holder itself. In order to determine the distance or the position of the holder in relation to the reference object, the holder or the reference object has a corresponding measurement or mirror face. A second reference object is provided, in particular, for a movement of the holder that scans the whole surface of the object to be measured, with the holder also being movably mounted in relation to the second reference object. A two-dimensional mobility of the holder in relation to the reference objects preferably extending in a corresponding plane preferably allows a displacement of the holder in the plane perpendicular to the rotational axis of the distance measuring instrument. In this respect, it is advantageous if a fourth distance sensor is used for determining the two-dimensional position of the holder in relation to the reference objects.

Provision can furthermore be made for the carrier on which the object is mounted to be rotatably mounted in order to displace all surface points of the object to be measured into the plane prescribed by the measuring apparatus.

In another embodiment, provision can furthermore be made for the first point, which lies on a surface section of the object to be measured, and the second point, which defines a point on the reference body or on the reference face thereof that corresponds to the angular position of the distance measuring instrument, to lie on an imaginary line, or define a line, along which the first and the second distance sensor are aligned. In other words, the two distance sensors of the distance measuring instrument, which are aligned in a diametrically opposing fashion, are aligned in such a way that a measurement beam emanating from the first distance sensor impinges substantially perpendicularly on the surface to be measured. The position of the second point on the reference body necessarily emerges as a result of this alignment.

According to another preferred embodiment, the carrier, which serves for the rotatable mount of the object to be measured, and the reference object are mechanically decoupled from one another, and more particularly, they can have any arrangement with respect to one another within predefined boundaries. It is not necessary to establish the positioning of the carrier relative to the reference object for carrying out a surface measurement of the object. Within the scope of a scanning or probing movement, the movable holder with the reference body thereof is moved in relation to the object. Here, the distance measuring instrument with the two distance sensors thereof aligned in opposing directions in each case measures the distance between the reference body and the surface of the object to be measured on the basis of a multiplicity of individual measurement points. From a comparison of the established distance data, it is possible, finally, to deduce the contour and the surface condition of the object to be measured.

According to another preferred embodiment, provision is made for a control unit, which is configured to align at least the first distance sensor along the surface normal of the first point on the surface section of the object to be measured. The control unit preferably serves for an automated adjustment and rotational movement of the distance sensor such that the signals emitted thereby are reflected back from the object. In the case of a mirrored surface of the object, there is a reflection back in the region around one hundred eighty degrees (180°) in relation to the emitted signal. Depending on the sensor design, it is also possible to deviate by up to three degrees) (3°), five degrees (5°) or ten degrees (10°) from the surface normal of the surface section to be examined. In the case of rough or scattering surfaces, different alignments of the sensor with respect to the surface normal, deviating therefrom, may become necessary. By way of example, the alignment of the sensor can be prescribed by a control unit.

It is found to be particularly advantageous for the second distance from the reference body, which can be established by the second distance sensor, to be able to be used directly for correcting the distance value that can be established by the first sensor. Here, the alignment of the two sensors or of the distance measuring instrument in relation to the at least one reference object plays no role. In order to correct or compensate for a change in the first distance caused by a rotation and/or displacement of the sensor, it is, in particular, unnecessary to establish any positional coordinates of the first and/or the second sensor. The two distances that can be established by the sensors aligned in a mutually opposite direction can be fed to a control unit for carrying out a direct error correction.

According to another preferred embodiment, all distance sensors are coupled to at least one light source by fiber-optic means. Free beam propagation merely occurs between the respective distance sensors and a respectively associated mirrored reference face. The fiber-optic connection requires comparatively little servicing and generally requires no readjustment during the operation of the device.

According to another advantageous embodiment, at least the first distance sensor, which faces the object, is furthermore coupled to a plurality of light sources of different wavelengths in order to determine the distance to the object by means of a multi-wavelength measurement principle. Such a multi-wavelength measurement method enables a very precise distance measurement with a resolution in the nanometer or sub-nanometer range and can, furthermore, provide a non-ambiguity range of the measurement result up into the millimeter range. Largely monochromatic lasers are preferably used as light sources, the wavelengths of which lie in the range between about 1520 and about 1630 nm. The employed laser wavelengths typically lie in the S, C or L band of the optical telecommunications spectrum. However, the laser light sources are by no means restricted to the infrared spectral range. Thus, in principle, use can also be made of wavelengths in the visible or in the UV spectral range.

In principle, the invention can also be implemented for a distance measuring instrument operating with merely one wavelength. However, the non-ambiguity range of the received signals can be visibly increased by means of a multi-wavelength measurement method. The distance measurement to the object to be measured is preferably brought about according to the method described in DE 10 2008 033 942 B3. The respective phase or phase shift of the rays reflected by the object surface is detected in a wavelength selective manner and processed within the scope of an electronic evaluation for determining the distance.

The invention furthermore relates to an associated method for measuring at least one surface section of an object which is mounted on a carrier. Here, the object is fixed at least in relation to a stationary reference object and a holder, on which a reference body and a distance measuring instrument are arranged, is moved with a movement scanning the object in a contactless fashion in at least a first direction in relation to the reference object and also in relation to the object to be measured. Within the scope of this scanning movement, the distance measuring instrument is used to determine a first distance to a first point on the surface section of the object and a second distance to a second point, corresponding thereto, on the reference body. It is possible to determine a distance of the two points precisely from the measurement of these two distances.

Since the position of the second point on the reference body is known and the position or relative position of the reference body in relation to the reference object is measured by means of at least one further distance sensor, this allows the position of the first point, which is situated on the object, to be determined in relation to the known reference object in a unique fashion and with a precision in the nanometer or sub-nanometer range.

In this respect, one development provides for at least a third distance sensor, which determines the distance between the reference object and the holder, at least along a first direction.

Advantageously, provision is furthermore made for at least a fourth distance sensor, which is preferably aligned substantially perpendicular to the third sensor in order to determine the position of the holder in the plane spanned by a first and a second reference object.

Finally, provision is made for the position of the first point on the surface section of the object to be measured to be determined in relation to the reference object on the basis of the first and the second distance, consequently on the basis of the distance between the reference body and the object to be measured, and on the basis of the distance between the reference object and the movable holder. Within the scope of a probing or scanning movement of the holder, or a rotation of the reference object even combined therewith, the whole surface of said reference object can be scanned point-by-point and measured with a precision in the nanometer or sub-nanometer range.

BRIEF DESCRIPTION OF THE DRAWINGS

Further goals, features and advantageous application options of the invention will be explained in more detail in the following description of exemplary embodiments. Here, all features described herein and depicted in the accompanying figures form the subject matter of the invention.

DETAILED DESCRIPTION OF EXEMPLARY EMBODIMENTS OF THE INVENTION

Figure 1:
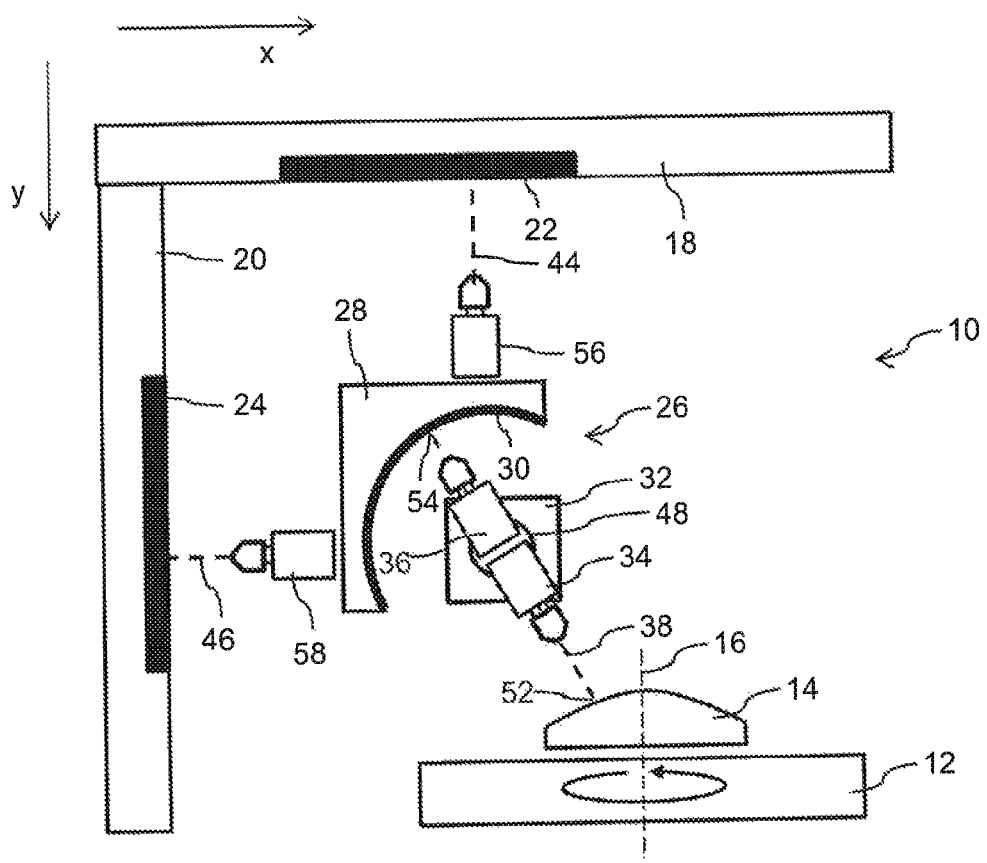
FIG. 1 shows a schematic side view of the device for measuring a surface section of an object mounted on a carrier.

The measuring apparatus 10 schematically illustrated in FIG. 1 has two reference objects 18, 20 arranged orthogonal to one another, from which the reference object 18 extends substantially in a first direction (x) and the second reference object 20 extends in a second direction (y) perpendicular to the first direction. Individual reference faces 22, 24 are provided on both reference objects 18, 20 and can, in the present exemplary embodiments, be configured as mirror surfaces.

The measuring apparatus 10 furthermore comprises a rotatably mounted carrier 12, on which an object 14 to be measured, for example an optical component such as a lens 14, is arranged. Here, the object carrier 12 is rotatably mounted about a rotational axis 16. The measuring apparatus 10 furthermore has a holder 26, which can move in the x-y plane and is depicted in a magnified illustration in FIG. 2.

The holder 26 has a main plate (not described in any more detail here), on which a reference body 28 and a bearing 32 for the rotatable mounting of two distance sensors 34, 36 are arranged. The reference body 28 has a mirror or reference face 30, which faces the distance measuring instrument 34, 36 and, in the present case, is configured in the style of a cylinder inner wall. Said mirror or reference face is preferably configured as a hollow mirror. The contour of the reference face 30 is to be measured precisely for calibrating the measuring apparatus 10. The contour and the individual points 54 to be scanned on the reference face 30 are known in terms of their position and stored in an evaluation unit.

The distance measuring instrument having two distance sensors 34, 36 aligned opposite to one another is held rotatably on the bearing 32 in relation to a rotational axis 48. Here, the rotational axis 48 preferably extends orthogonal to the plane (x, y) spanned by the two reference objects 18, 20. The distance sensor 34 directed at the object 14 is in this case preferably configured as a multi-wavelength sensor, which is designed to determine an absolute distance between the sensor 34, or between the measurement head 50 thereof, and a selected first point 52 on the surface of the object 14 to be measured.

Here, the two sensors 34, 36 are fixed with respect to one another. They are moreover aligned diametrically to one another in relation to the rotational axis 48. A change in the alignment of the sensor 34 is therefore always accompanied by a corresponding change in direction of the sensor 36.

Here, the sensor 34 measures in reflection geometry. That is to say that the measurement beam directed at the point 52 is mirrored back identically and is detected by the measurement head 50 again and finally fed to a sensor or detection unit 76, 78, 80, 82, which is coupled to the measurement head 34 and indicated in FIG. 3. The alignment or orientation of the sensor head 34 should be modified depending on the contour of the object 14 to be measured and on the relative positioning of the holder 26 in relation to the object 14. However, a rotation of the distance sensor 34, 36 about the rotational axis 48 can be accompanied by a displacement of the distance sensor 34 in relation to the holder 26.

By virtue of the second distance sensor 36 being aligned toward the reference face 30 of the reference body 28 in a direction counter to the first sensor 34, a translation in relation to the known reference body 28, caused, for example, by the rotational movement 42 of the distance measuring instrument 34, 36, can be measured precisely and compensated for within the scope of the electronic evaluation of recorded or detected measurement signals.

By way of example, if the sensor 34 experiences a displacement, for example in the direction of the object 14 as a result of rotation, this would reduce the distance 38 to be measured. However, such a displacement would simultaneously also increase the second distance between the opposite sensor 36 and the fixed reference face 30 quantitatively by the same amount. In this fashion, possible rotationally dependent positional inaccuracies of the distance measuring instrument 34, 36 can be compensated for precisely by the second sensor 36 by virtue of measuring a second distance 40 in relation to a selected second point 54 on the reference face 30.

The position of the holder 26 in relation to the reference objects 18, 20 can be brought about by means of two further distance sensors 56, 58, which respectively establish the distance 44 in the y-direction or the distance 46 in the x-direction to the respective reference object 18, 20.

The alignment of the distance measuring instrument 34, 36 in relation to the geometry or position of the reference body 28 emerges from the point 52 to be measured on the surface of the object 14. In the process, it is feasible to align the distance sensor 34 directed at the object 14 always orthogonal to the respective point 52 by means of suitable sensors and electromechanical actuating apparatuses. The angle of the first and/or the second distance sensor 34, 36 set in the process can then find use in determining the distance 40.

The distance value 40 actually measured to the predetermined angle can be compared to a reference value recorded within the scope of a calibration process. The deviation directly provides a length correction for the measured distance 38.

Figure 2:
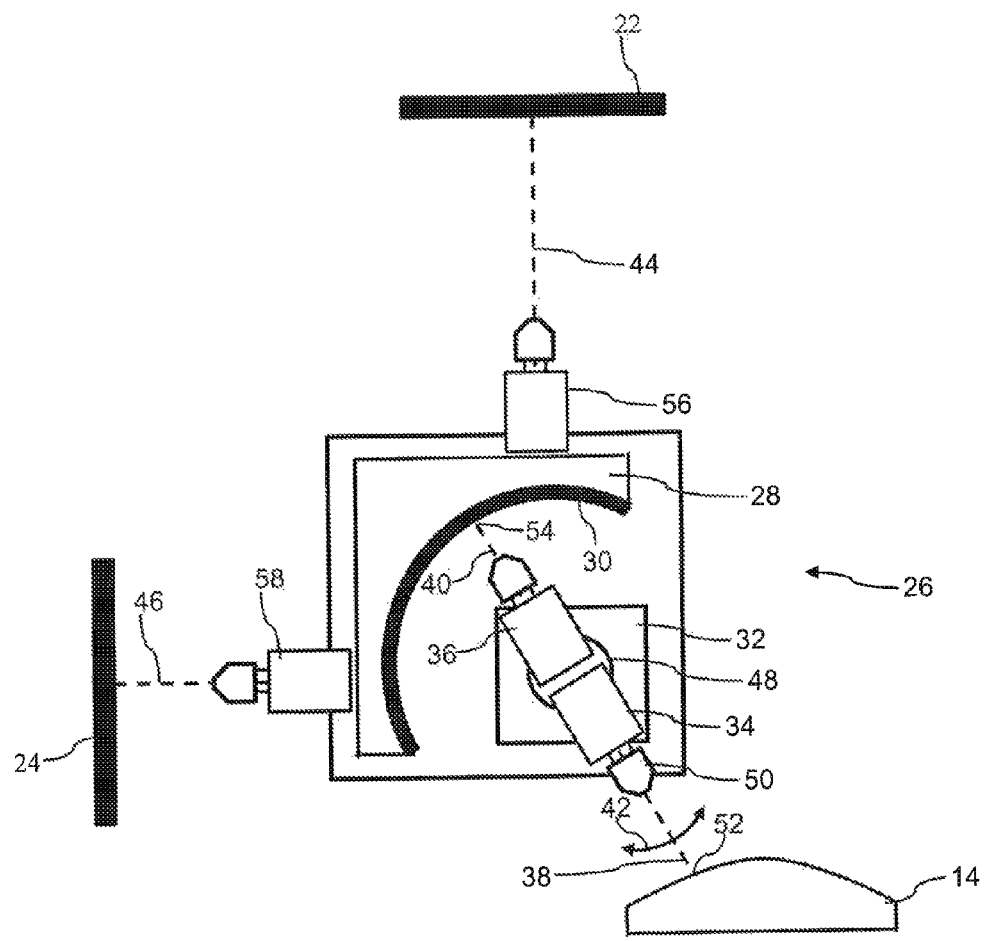
FIG. 2 shows a magnified illustration of the movably mounted holder.
Figure 3:
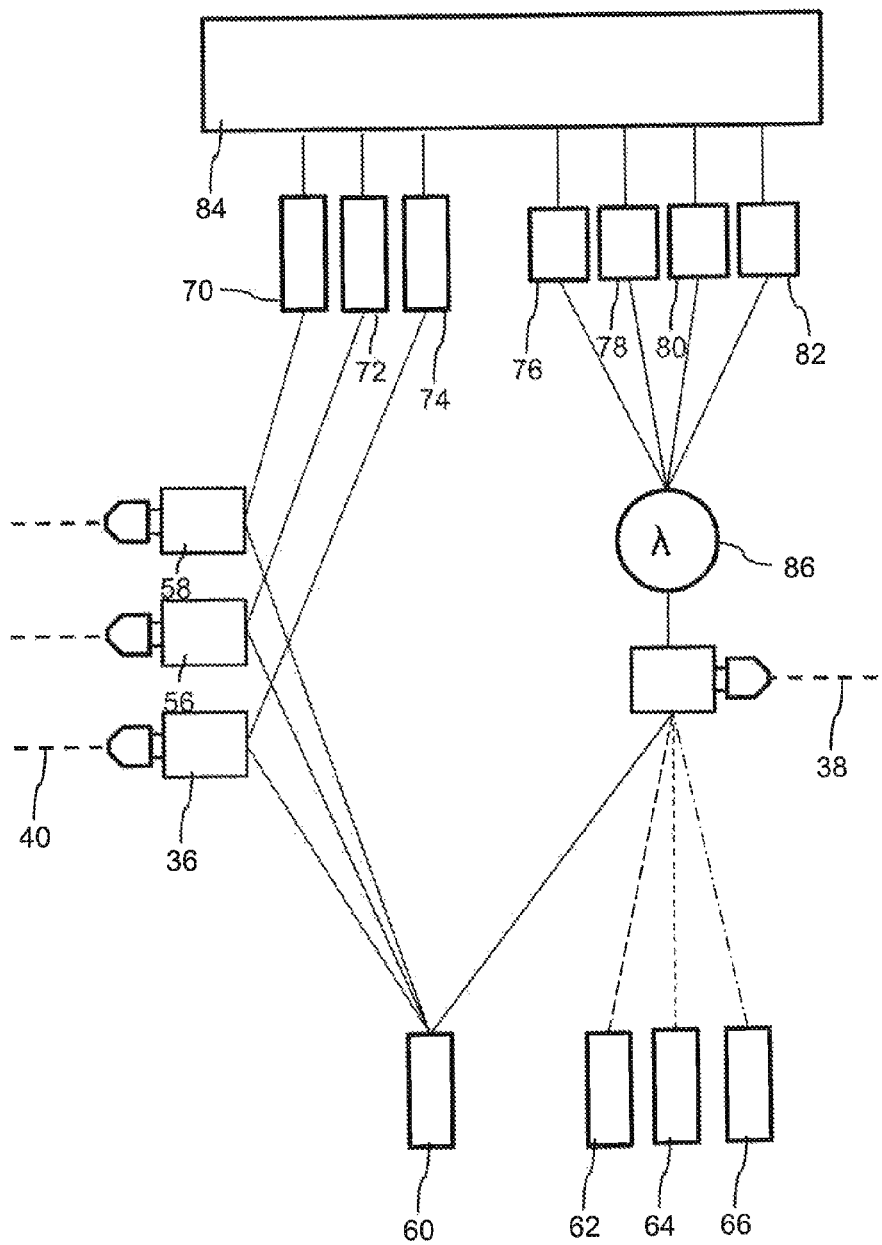
FIG. 3 shows a schematic illustration of the fiber-optic coupling of the distance sensors shown in FIG. 1 and FIG. 2, with various laser light sources and associated detectors.

FIG. 3 furthermore schematically illustrates the fiber-optic concept underlying the measuring device shown in FIG. 1 and FIG. 2. In an exemplary embodiment, the measuring device has four laser light sources 60, 62, 64, 66 with different wavelengths. Here, all laser signals are fed to the multi-wavelength distance sensor 34 by fiber-optic means. Using these, the distance 38 to an object 14 to be measured can be measured in accordance with a multi-wavelength measuring method. At least one of the lasers is also employed for the remaining three distance sensors 36, 56, 58.

Here, the distance sensors 36, 56, 58 are fed by one and the same laser light source. Each of these sensors can accordingly determine the distance, as illustrated in FIG. 2, of the respectively associated reference body 28 or reference object 18, 20. The measurement signals detected by the sensors 36, 56 and 58 in reflection geometry are fed to individual detectors 70, 72, 74 by fiber-optic means, with the signals from said detectors being fed to a central evaluation unit 84.

The main distance sensor 34 in particular, which is configured to measure an inherently unknown topology or surface of the object 14, is supplied with signals from a total of four laser light sources 60, 62, 64, 66. The signal, likewise detected in reflection geometry, is, proceeding from the detector of the distance sensor 34, fed to a fiber splitter or de-multiplexer 86, which feeds the detected interferometric measurement signal reflected from the surface of the object 14 to individual detectors 76, 78, 80, 82 in a wavelength selective fashion.

Suitable evaluation electronics, as known from, for example, DE 10 2008 033 942 B3, can be used to establish the distance 38 between the distance sensor 34 and the surface of the object 14 to be measured precisely in the nanometer range or even in the sub-nanometer range.

Reference is finally made to the fact that the number and type of the laser light sources described herein, and also the arrangement of the individual detectors, are only shown in an exemplary fashion. Many varied modifications in respect of the type and number and the fiber-optical coupling of individual light sources and detectors can be undertaken within the scope of the invention.

The invention claimed is:

1. A device for measuring at least one surface section of an object mounted on a carrier, comprising:
    at least one reference object fixed in relation to the carrier, and
    a holder movable in at least a first direction in relation to the reference object, a reference body and a distance measuring instrument being arranged on the holder and being mounted rotatable relative to one another;
    wherein the distance measuring instruments is configured to determine a first distance to a first point on the surface section of the object using a first distance sensor facing the object, and a second distance to a second point on the reference body using a second distance sensor facing the reference body, the second point corresponding to the first point; and
    wherein the first distance sensor and the second distance sensor are aligned diametrically opposite to one another.

2. The device of claim 1, wherein the distance measuring instrument is mounted rotatably on the holder and the reference body is arranged in a rotationally fixed manner on the holder.

3. The device of claim 1, wherein the reference body has a reference face that is matched to the rotational mobility of the distance measuring instrument.

4. The device of claim 3, wherein the reference face is configured as a hollow mirror with a substantially circular segment-like geometry, and wherein the center of the hollow mirror substantially coincides with a rotational axis of the distance measuring instrument.

5. The device of claim 2, wherein a distance between the reference object and the holder is determined by at least a third distance sensor.

6. The device of claim 1, wherein the carrier and the reference object are mechanically decoupled from one another.

7. The device of claim 1, further comprising a control unit configured to align at least the first distance sensor along a surface normal to the first point on the surface section of the object.

8. The device of claim 1, wherein the second distance compensates for a change in the first distance caused by a rotation of the distance measuring instrument.

9. The device of claim 1, wherein at least the first distance sensor and the second distance sensor are coupled to at least one light source by fiber-optic means.

10. The device of claim 1, wherein at least the first distance sensor facing the object is coupled to a plurality of light sources of different wavelengths in order to determine the distance to the object by means of multi-wavelength measurement principle.

11. A method for measuring at least one surface section of an object, comprising:
    mounting the object on a carrier such that the object is fixed in relation to a stationary reference object;
    providing a holder on which a reference body and a distance measuring instrument having a first distance sensor and a second distance sensor are arranged;
    moving the holder with a movement scanning the object without contacting the object in at least a first direction in relation to the reference object; and
    using the distance measuring instrument, determining a first distance to a first point on the surface section of the object with the first distance sensor facing the object and a second distance to a second point on the reference body with the second distance sensor facing the reference body, the second point corresponding to the first point, and the first distance sensor and the second distance sensor aligned diametrically opposite to one another.

12. The method of claim 11, further comprising determining a distance between the reference object and the holder by means of the second distance sensor.

13. The method of claim 12, wherein the position of the first point in relation to the reference object is determined on the basis of the first distance and the second distance and further on the basis of the distance between the reference object and the holder.

* * * * *